United States Patent
Wang et al.

(10) Patent No.: US 12,360,948 B2
(45) Date of Patent: Jul. 15, 2025

(54) FILE GENERATION METHOD AND ELECTRONIC DEVICE

(71) Applicant: Huawei Technologies Co., Ltd., Shenzhen (CN)

(72) Inventors: Shen Wang, Shenzhen (CN); Yang Gao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/027,035

(22) PCT Filed: Sep. 6, 2021

(86) PCT No.: PCT/CN2021/116745
§ 371 (c)(1),
(2) Date: Mar. 17, 2023

(87) PCT Pub. No.: WO2022/057663
PCT Pub. Date: Mar. 24, 2022

(65) Prior Publication Data
US 2023/0376459 A1  Nov. 23, 2023

(30) Foreign Application Priority Data
Sep. 18, 2020  (CN) .......................... 202010991909.3

(51) Int. Cl.
*G06F 16/16* (2019.01)
*G06F 16/13* (2019.01)
*G06F 16/957* (2019.01)

(52) U.S. Cl.
CPC .............. *G06F 16/16* (2019.01); *G06F 16/13* (2019.01); *G06F 16/957* (2019.01)

(58) Field of Classification Search
CPC ......... G06F 16/16; G06F 16/13; G06F 16/957
USPC ........................................................ 707/821
See application file for complete search history.

(56) References Cited

U.S. PATENT DOCUMENTS

| | | | |
|---|---|---|---|
| 11,010,409 B1* | 5/2021 | Dangi | G06F 16/1844 |
| 2002/0152245 A1* | 10/2002 | McCaskey | G06F 16/958 715/255 |
| 2005/0050461 A1* | 3/2005 | Hall | G06F 16/957 707/E17.119 |
| 2005/0076066 A1* | 4/2005 | Stakutis | G06F 16/10 |
| 2005/0108433 A1 | 5/2005 | Wu et al. | |
| 2006/0101385 A1 | 5/2006 | Gerken et al. | |

(Continued)

FOREIGN PATENT DOCUMENTS

| | | |
|---|---|---|
| CN | 102073633 A | 5/2011 |
| CN | 102184231 A | 9/2011 |

(Continued)

*Primary Examiner* — Kuen S Lu
(74) *Attorney, Agent, or Firm* — Conley Rose, P.C.

(57) ABSTRACT

A file generation method includes obtaining first information based on a resource index file, where the resource index file comprises indexes, file names, and first path information of a plurality of resource files, where the resource files include a first resource file and a second resource file, where the first information includes second path information and a file name of a first file; loading the first file based on the first information; obtaining the first resource file and the second resource file from the first file based on second information; and displaying the first page based on the first resource file and the second resource file.

20 Claims, 9 Drawing Sheets

(56) References Cited

U.S. PATENT DOCUMENTS

| | | | | |
|---|---|---|---|---|
| 2008/0177799 | A1* | 7/2008 | Wilson | H04N 1/32133 |
| 2020/0250141 | A1* | 8/2020 | Liu | G06F 11/1451 |

FOREIGN PATENT DOCUMENTS

| | | | |
|---|---|---|---|
| CN | 103020155 | A | 4/2013 |
| CN | 103327033 | A | 9/2013 |
| CN | 105354049 | A | 2/2016 |
| CN | 106020725 | A | 10/2016 |
| CN | 106020891 | A | 10/2016 |
| CN | 107800748 | A | 3/2018 |
| CN | 108280216 | A | 7/2018 |
| CN | 109408750 | A | 3/2019 |
| CN | 109471643 | A | 3/2019 |
| CN | 109634654 | A | 4/2019 |
| CN | 110059278 | A | 7/2019 |
| CN | 110244955 | A | 9/2019 |
| CN | 111443942 | A | 7/2020 |
| WO | 2012167742 | A1 | 12/2012 |

\* cited by examiner

FILE GENERATION METHOD AND ELECTRONIC DEVICE

CROSS-REFERENCE TO RELATED APPLICATIONS

This is a U.S. National Stage of International Patent Application No. PCT/CN2021/116745 filed on Sep. 6, 2021, which claims priority to Chinese Patent Application No. 202010991909.3 filed on Sep. 18, 2020. Both of the aforementioned applications are hereby incorporated by reference in their entireties.

TECHNICAL FIELD

This application relates to the field of electronic technologies, and in particular, to a file generation method and an electronic device.

BACKGROUND

After a user opens an app (Application, APP) on an electronic device on which the app is installed, a display of the electronic device displays a related page of the app. For example, after the user opens a Huawei game app on the electronic device, the electronic device displays a home page of the Huawei game app.

An installation package of the app usually includes various types of files such as a page layout file, an image resource file, and a media resource file. The page layout file may describe all resource files required by a page of the app.

In a process of opening the app, an operating system (operating system, OS) determines, based on the page layout file, a resource file required by a page to be displayed by the app, loads the resource file, and displays the resource file to a user on the display.

For the user, after the user opens the app, a faster speed at which a corresponding page is displayed provides better user experience. Therefore, it is necessary to accelerate a page display speed of the app.

SUMMARY

This application provides a file generation method and an electronic device. In a compilation phase of an app, a page layout file corresponding to each page of the app is parsed, original resource files belonging to a same page or pages with an association relationship are combined into one file, so that during page displaying, when the original resource files are loaded, a resource file generated after combination is actually loaded, and the original resource files are sequentially and continuously read from the resource file generated after combination. The original resource files do not need to be sequentially loaded and then read during page displaying, thereby improving a speed of reading the original resource files during page displaying, and improving a page display speed.

According to a first aspect, a method is provided, applied to an electronic device. The method includes: obtaining first information based on a resource index file, where the resource index file includes indexes, file names, and path information of a plurality of resource files, the plurality of resource files include the first resource file and the second resource file, and the first information includes path information and a file name of the first file loading the first file based on the first information, where the first file is generated by combining the first resource file and the second resource file, and the first resource file and the second resource file belong to a first page; obtaining the first resource file and the second resource file from the first file based on second information, where the second information is used to extract the first resource file and the second resource file from the first resource file; and displaying, by the electronic device, the first page based on the first resource file and the second resource file.

It should be noted that a file loading process in this embodiment of this application may be a process in which a file is first read from a nonvolatile memory and then the read file is stored in a random access memory. For example, for the first file, during loading of the first file, the first file may be read from the nonvolatile memory, and then the first file is stored in the random access memory.

Based on the foregoing technical solution, in a compilation phase of an app, original resource files belonging to a same page are combined into one file based on a page layout file corresponding to each page of the app, so that during page displaying, when the original resource files are loaded, a resource file generated after combination is actually loaded. For example, during loading of the resource file generated after combination, the resource file generated after combination is read from the nonvolatile memory, and then the resource file generated after combination is stored in the random access memory, so that the original resource files can be sequentially and continuously read from the resource file generated after combination. The original resource files do not need to be sequentially loaded and then read during page displaying, thereby improving a speed of reading the original resource files during page displaying, and improving a page display speed.

It should be noted that, in the method provided in this embodiment of this application, a quantity of original resource files included on the page is not limited. In other words, the method provided in this embodiment of this application is also applicable to a case in which one page includes a plurality of original resource files.

With reference to the first aspect and the foregoing implementations, in some implementations of the first aspect, the second Information includes an offset of a start location of the first resource file relative to a start location of the first file and an offset of a start location of the second resource file relative to the start location of the first file.

Based on the foregoing technical solution, during page displaying, the electronic device can determine a location of the first resource file in the first file and a length of the first resource file based on the second information, determine a location of the second resource file in the first file and a length of the second resource file, and sequentially obtain the first resource file and the second resource file from the first file based on the location and the length, so as to display the first page based on the first resource file and the second resource file.

With reference to the first aspect and the foregoing implementations, in some implementations of the first aspect, the second information includes a length of the first resource file and a length of the second resource file.

Based on the foregoing technical solution, during page displaying, the electronic device can determine the location of the first resource file in the first file and the length of the first resource file based on the second information, determine the location of the second resource file in the first file and the length of the second resource file, and sequentially obtain the first resource file and the second resource file from the first file based on the location and the length, so as to display the first page based on the first resource file and the second resource file.

With reference to the first aspect and the foregoing implementations, in some implementations of the first aspect, the second information is stored in the first file or the resource index file.

Based on the foregoing technical solution, the second information is stored in the first file or the resource index file, so that during page displaying, the electronic device can quickly obtain the second information, and obtain the first resource file and the second resource file from the first file based on the second information, thereby improving a speed of displaying the first page based on the first resource file and the second resource file.

With reference to the first aspect and the foregoing implementations, in some implementations of the first aspect, the first resource file and the second resource file are of a same type.

With reference to the first aspect and the foregoing implementations, in some implementations of the first aspect, a length of the first file is less than or equal to a preset threshold.

Based on the foregoing technical solution, because a size of the resource file generated after combination affects a loading speed, a length of the resource file generated after combination is limited, for example, it is specified that the length of the first file is less than or equal to the preset threshold, to improve a display speed.

According to a second aspect, a file generation method is provided. The method includes: obtaining a page layout file of a first page; determining, based on the page layout file of the first page, that the first page includes a first resource file and a second resource file; and combining the first resource file and the second resource file, to generate a first file.

It should be noted that a file loading process in this embodiment of this application may be a process in which a file is first read from a nonvolatile memory and then the read file is stored in a random access memory. For example, for the first file, during loading of the first file, the first file may be read from the nonvolatile memory, and then the first file is stored in the random access memory.

Based on the foregoing technical solution, in a compilation phase of an app, original resource files belonging to a same page are combined into one file based on a page layout file corresponding to each page of the app, so that during page displaying, when the original resource files are loaded, a resource file generated after combination is actually loaded. For example, during loading of the resource file generated after combination, the resource file generated after combination is read from the nonvolatile memory, and then the resource file generated after combination is stored in the random access memory, so that the original resource files can be sequentially and continuously read from the resource file generated after combination. The original resource files do not need to be sequentially loaded and then read during page displaying, thereby improving a speed of reading the original resource files during page displaying, and improving a page display speed.

It should be noted that, in the file generation method provided in this embodiment of this application, a quantity of original resource files included on the page is not limited. In other words, the file generation method provided in this embodiment of this application is also applicable to a case in which one page includes a plurality of original resource files.

With reference to the second aspect, in some implementations of the second aspect, the determining, based on the page layout file of the first page, that the first page includes a first resource file and a second resource file includes: determining, based on an identifier of the first resource file and an identifier of the second resource file that are included in the page layout file of the first page, that the first resource file and the second resource file belong to the first page.

With reference to the second aspect, in some implementations of the second aspect, the first file stores an offset of a start location of the first resource file relative to a start location of the first file and an offset of a start location of the second resource file relative to the start location of the first file, and/or the first file stores a length of the first resource file and a length of the second resource file.

Based on the foregoing technical solution, during page displaying, the electronic device can determine the location of the first resource file in the first file and the length of the first resource file based on the second information, determine the location of the second resource file in the first file and the length of the second resource file, and sequentially obtain the first resource file and the second resource file from the first file based on the location and the length, so as to display the first page based on the first resource file and the second resource file.

With reference to the second aspect, in some implementations of the second aspect, the method further includes: generating a resource index file. The resource index file includes indexes, file names, and path information of a plurality of resource files, and the plurality of resource files include the first resource file and the second resource file.

With reference to the second aspect, in some implementations of the second aspect, the resource index file stores the offset of the start location of the first resource file relative to the start location of the first file and the offset of the start location of the second resource file relative to the start location of the first file, and/or the first file stores the length of the first resource file and the length of the second resource file.

With reference to the second aspect and the foregoing implementations, in some implementations of the second aspect, the first resource file and the second resource file are determined based on at least one page layout file of the first page.

With reference to the second aspect and the foregoing implementations, in some implementations of the second aspect, the first resource file and the second resource file are of a same type.

With reference to the second aspect and the foregoing implementations, in some implementations of the second aspect, a length of the first file is less than or equal to a preset threshold.

Based on the foregoing technical solution, because a size of the resource file generated after combination affects a loading speed, a length of the resource file generated after combination is limited, for example, it is specified that the length of the first file is less than or equal to the preset threshold, to accelerate a display speed.

According to a third aspect, a method is provided, applied to an electronic device including a display. The method includes: obtaining a page layout file of a first page; determining, based on the at least one page layout file of the first page, that the first page includes a first resource file and a second resource file; combining the first resource file and the second resource file, to generate a first file; obtaining first information based on a resource index file, where the resource index file includes indexes, file names, and path information of a plurality of resource files, the plurality of resource files include the first resource file and the second resource file, and the first information includes path information and a file name of the first file; loading the first file based on the first information; obtaining the first resource file and the second resource file from the first file based on second information; where the second information is used to extract the first resource file and the second resource file from the first resource file; and displaying, by the electronic device, the first page based on the first resource file and the second resource file.

It should be noted that a file loading process in this embodiment of this application may be a process in which a file is first read from a nonvolatile memory and then the read file is stored in a random access memory. For example, for the first file, during loading of the first file, the first file may be read from the nonvolatile memory, and then the first file is stored in the random access memory.

Based on the foregoing technical solution, in a compilation phase of an app, original resource files belonging to a same page are combined into one file based on a page layout file corresponding to each page of the app, so that during page displaying, when the original resource files are loaded, a resource file generated after combination is actually loaded. For example, during loading of the resource file generated after combination, the resource file generated after combination is read from the nonvolatile memory, and then the resource file generated after combination is stored in the random access memory, so that the original resource files can be sequentially and continuously read from the resource file generated after combination. The original resource files do not need to be sequentially loaded and then read during page displaying, thereby improving a speed of reading the original resource files during page displaying, and improving a page display speed.

It should be noted that, in the method provided in this embodiment of this application, a quantity of original resource files included on the page is not limited. In other words, the method provided in this embodiment of this application is also applicable to a case in which one page includes a plurality of original resource files.

According to a fourth aspect, a file is provided, including a first file generated in the file generation method in the second aspect, and/or including a resource index file generated in the file generation method in the second aspect.

According to a fifth aspect, an electronic device is provided, and includes a display, a memory, one or more processors, and one or more programs. The one or more programs are stored in the memory. When the one or more processors execute the one or more programs, the electronic device is enabled to perform the method in any possible implementation of any one of the foregoing aspects.

According to a sixth aspect, an electronic device is provided, and includes a memory, one or more processors, and one or more programs. The one or more programs are stored in the memory. When the one or more processors execute the one or more programs, the electronic device is enabled to perform the file generation method in any possible implementation of any one of the foregoing aspects.

According to a seventh aspect, an apparatus is provided, including a processing module and a display module. The processing module is configured to obtain first information based on a resource index file. The resource index file includes indexes, file names, and path information of a plurality of resource files, the plurality of resource files include the first resource file and the second resource file, and the first information includes path information and a file name of the first file. The processing module is further configured to load the first file based on the first information. The first file is generated by combining the first resource file and the second resource file, and the first resource file and the second resource file belong to a first page. The processing module is further configured to obtain the first resource file and the second resource file from the first file based on second information. The second information is used to extract the first resource file and the second resource file from the first resource file. The display module is configured to display the first page based on the first resource file and the second resource file.

With reference to the seventh aspect and the foregoing implementations, in some implementations of the seventh aspect, the second information includes an offset of a start location of the first resource file relative to a start location of the first file and an offset of a start location of the second resource file relative to the start location of the first file.

With reference to the seventh aspect and the foregoing implementations, in some implementations of the seventh aspect, the second information includes a length of the first resource file and a length of the second resource file.

With reference to the seventh aspect and the foregoing implementations, in some implementations of the seventh aspect, the second information is stored in the first file or the resource index file.

With reference to the seventh aspect and the foregoing implementations, in some implementations of the seventh aspect, the first resource file and the second resource file are of a same type.

With reference to the seventh aspect and the foregoing implementations, in some implementations of the seventh aspect, a length of the first file is less than or equal to a preset threshold.

According to an eighth aspect, an apparatus is provided, and includes a processing module. The processing module is configured to obtain a page layout file of a first page. The processing module is further configured to determine, based on the page layout file of the first page, that the first page includes a first resource file and a second resource file. The processing module is further configured to combine the first resource file and the second resource file, to generate a first file.

With reference to the eighth aspect and the foregoing implementations, in some implementations of the eighth aspect, the processing module is further configured to determine, based on an identifier of the first resource file and an identifier of the second resource file that are included in the page layout file of the first page, that the first resource file and the second resource file belong to the first page.

With reference to the eighth aspect and the foregoing implementations, in some implementations of the eighth aspect, the first file stores an offset of a start location of the first resource file relative to a start location of the first file and an offset of a start location of the second resource file relative to the start location of the first file, and/or the first file stores a length of the first resource file and a length of the second resource file.

With reference to the eighth aspect and the foregoing implementations, in some implementations of the eighth aspect, the processing module is further configured to generate a resource index file. The resource index file includes indexes, file names, and path information of a plurality of resource files, and the plurality of resource files include the first resource file and the second resource file.

With reference to the eighth aspect and the foregoing implementations, in some implementations of the eighth aspect, the resource index file stores the offset of the start location of the first resource file relative to the start location of the first file and the offset of the start location of the second resource file relative to the start location of the first file, and/or the first file stores the length of the first resource file and the length of the second resource file.

With reference to the eighth aspect and the foregoing implementations, in some implementations of the eighth aspect, the first resource file and the second resource file are determined based on at least one page layout file of the first page.

With reference to the eighth aspect and the foregoing implementations, in some implementations of the eighth aspect, the first resource file and the second resource file are of a same type.

With reference to the eighth aspect and the foregoing implementations, in some implementations of the eighth aspect, a length of the first file is less than or equal to a preset threshold.

According to a ninth aspect, an apparatus is provided, and includes a processing module and a display module. The processing module is configured to obtain a page layout file of a first page. The processing module is further configured to determine, based on at least one page layout file of the first page, that the first page includes a first resource file and a second resource file, and that the first information includes path information and a file name of the first file. The processing module is further configured to combine the first resource file and the second resource file, to generate a first file. The processing module is further configured to obtain first information based on a resource index file. The resource index file includes indexes, file names, and path information of a plurality of resource files, and the plurality of resource files include the first resource file and the second resource file. The processing module is further configured to load the first file based on the first information. The processing module is further configured to obtain the first resource file and the second resource file from the first file based on second information. The second information is used to extract the first resource file and the second resource file from the first resource file. The display module is configured to display the first page based on the first resource file and the second resource file.

According to a tenth aspect, this application provides a computer storage medium, including computer instructions. When the computer instructions run on an electronic device, the electronic device is enabled to perform the method in any possible implementation of the foregoing aspects.

According to an eleventh aspect, this application provides a computer storage medium, including computer instructions. When the computer instructions run on an electronic device, the electronic device is enabled to perform the file generation method in any possible implementation of any one of the foregoing aspects.

According to a twelfth aspect, this application provides a computer program product. When the computer program product runs on an electronic device, the electronic device is enabled to perform the method in any possible implementation of the foregoing aspects.

According to a thirteenth aspect, this application provides a computer program product. When the computer program product runs on an electronic device, the electronic device is enabled to perform the file generation method in any possible implementation of any one of the foregoing aspects.

Figure 3:
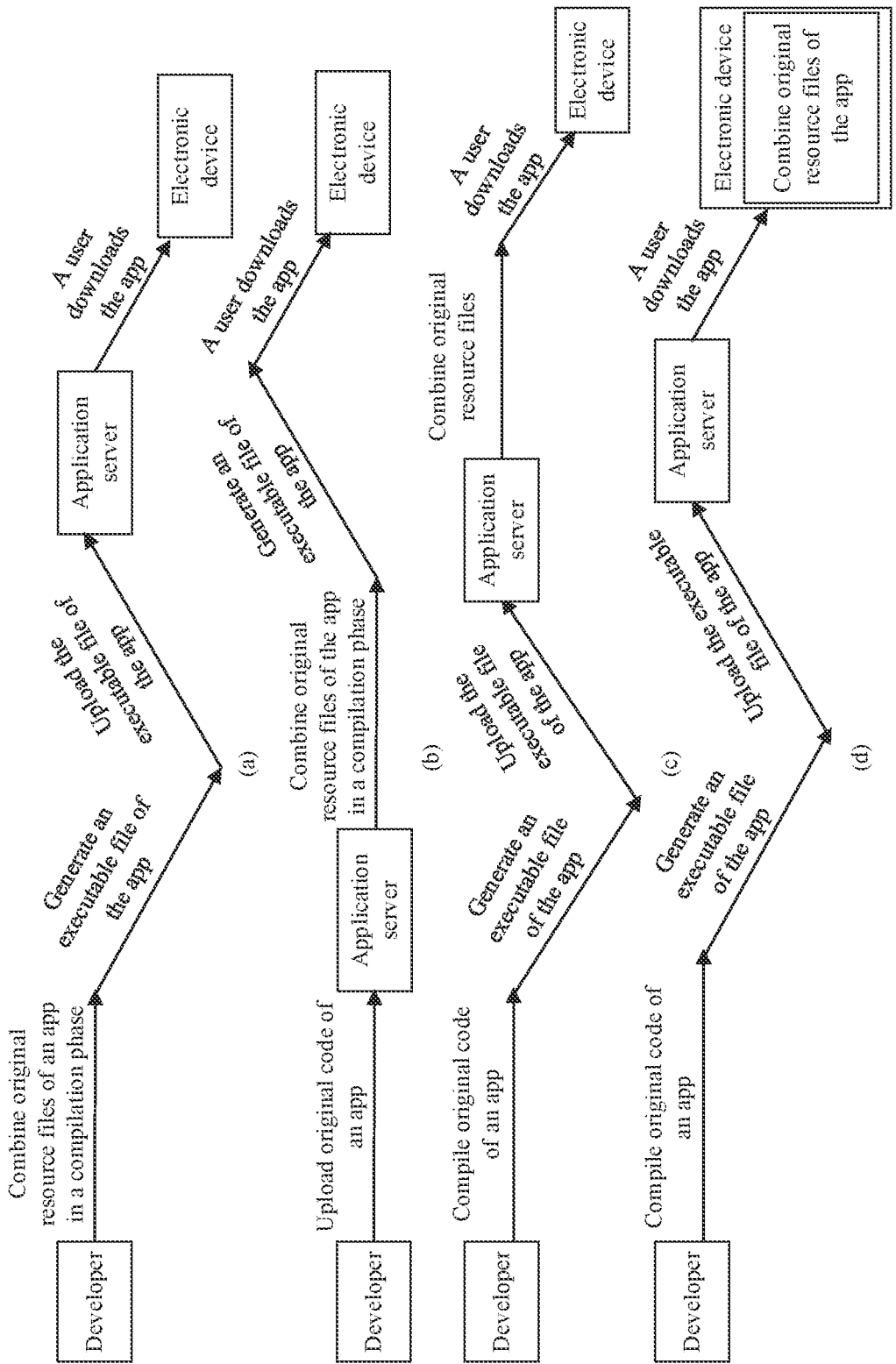
Figure 4:
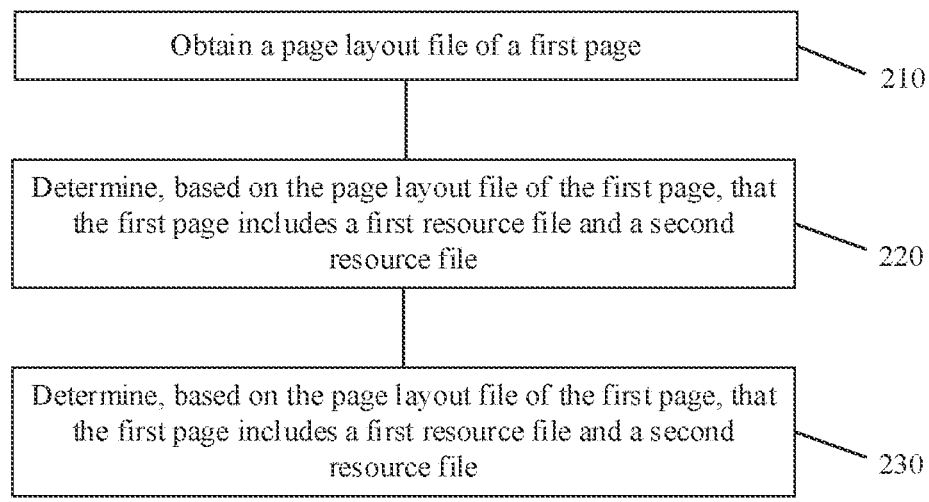
Figure 5:
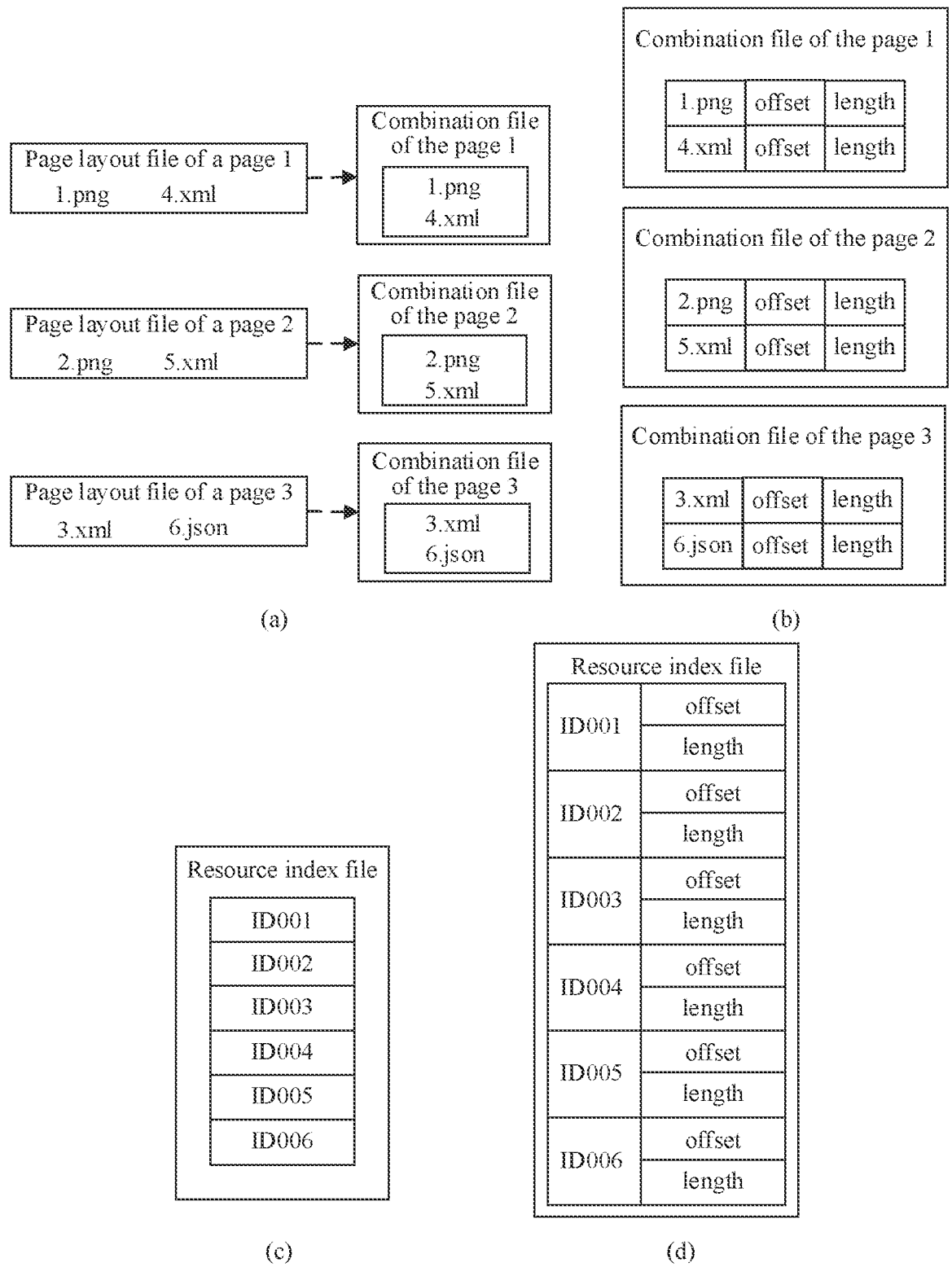
Figure 6:
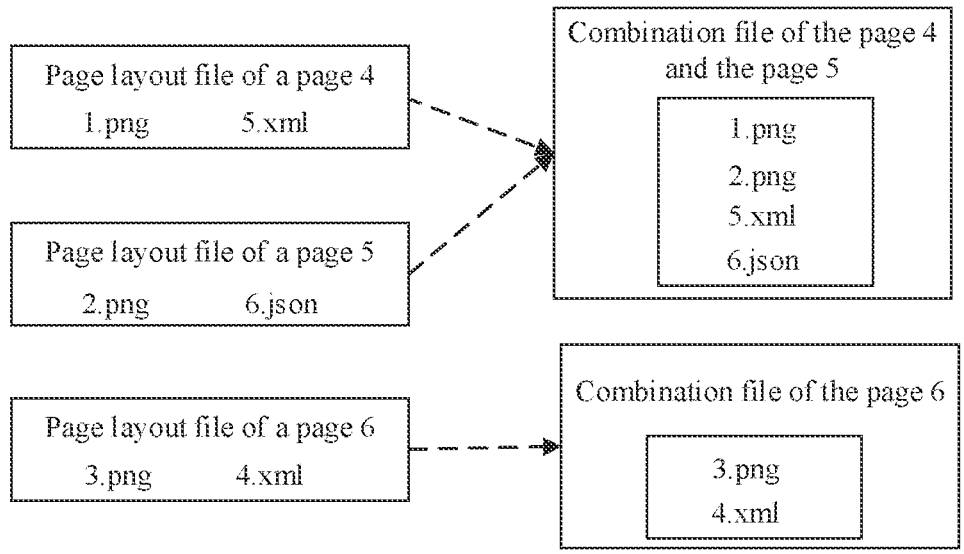
Figure 7:
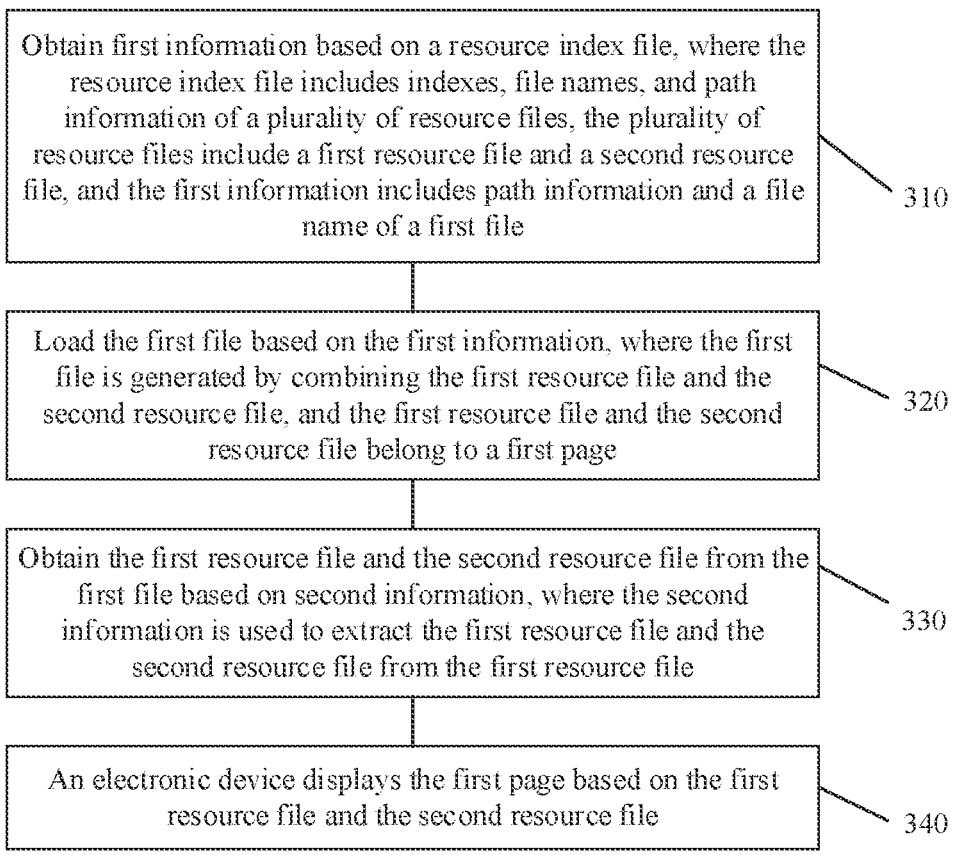
Figure 8:
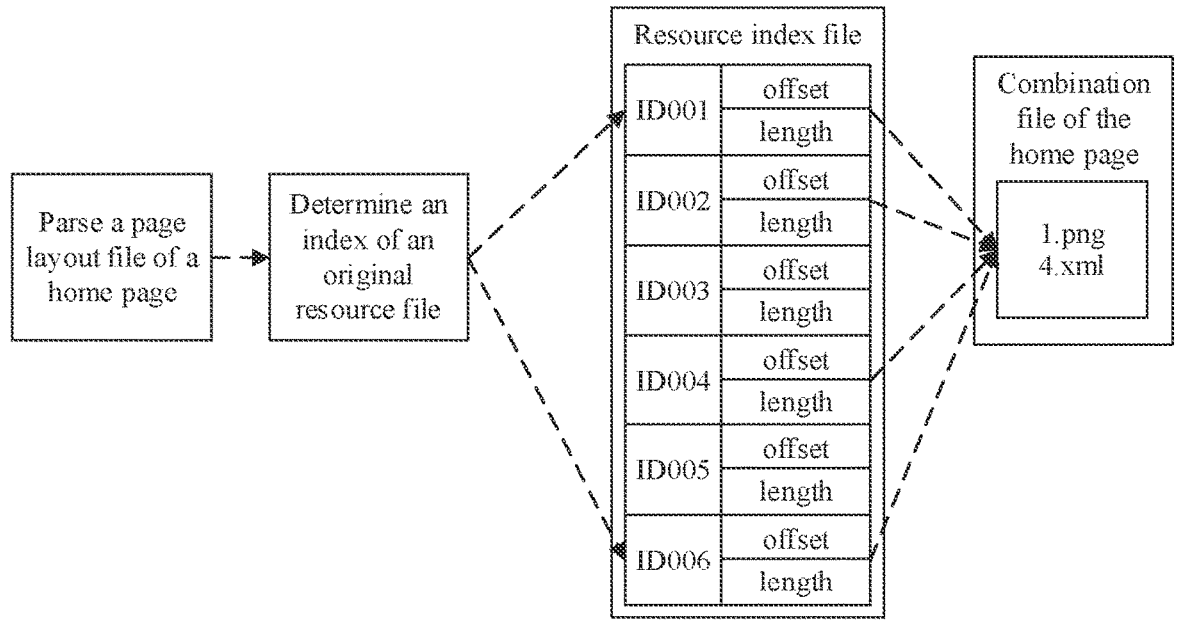
Figure 9:
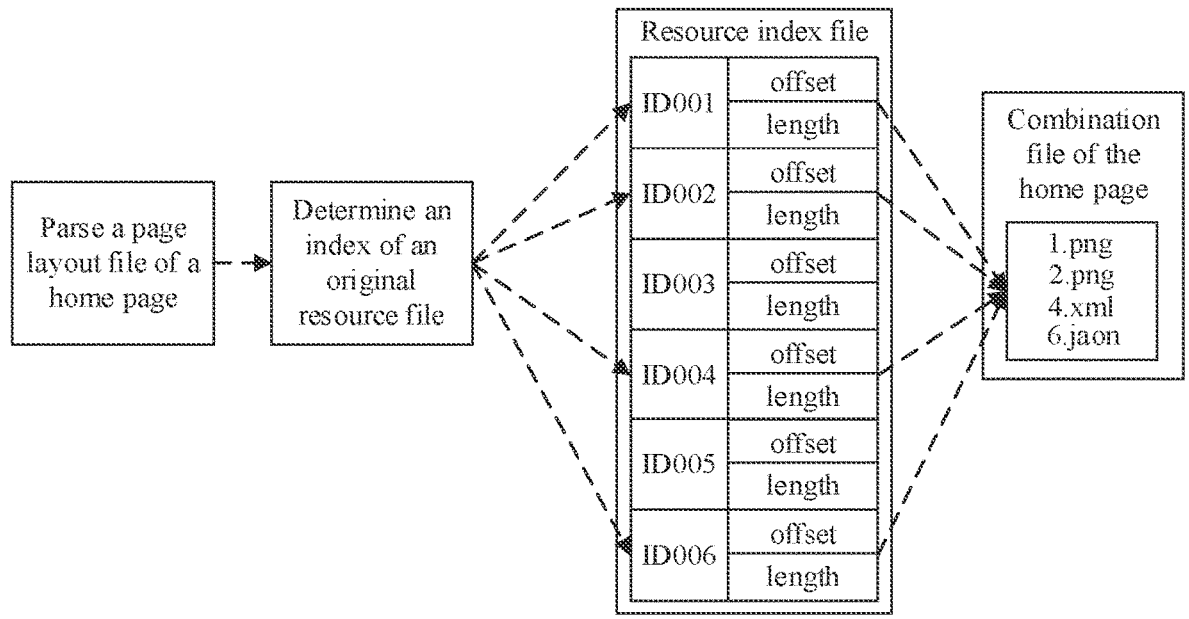
Figure 10:
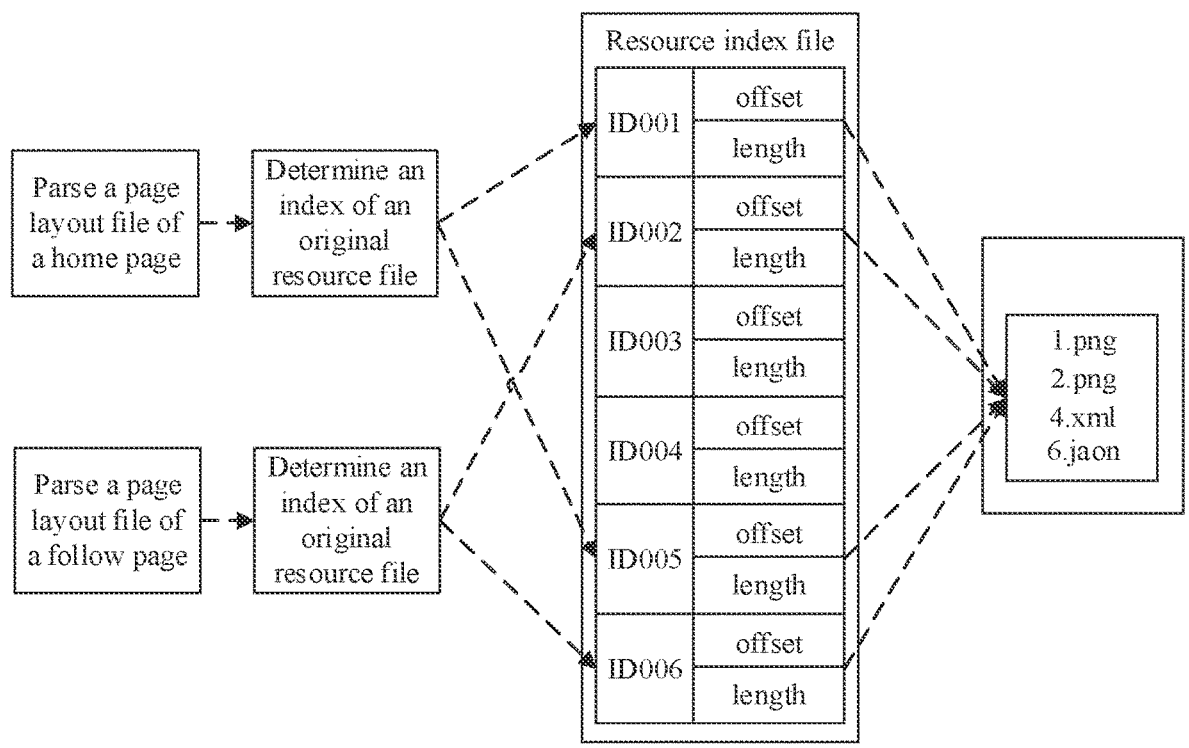
Figure 11:
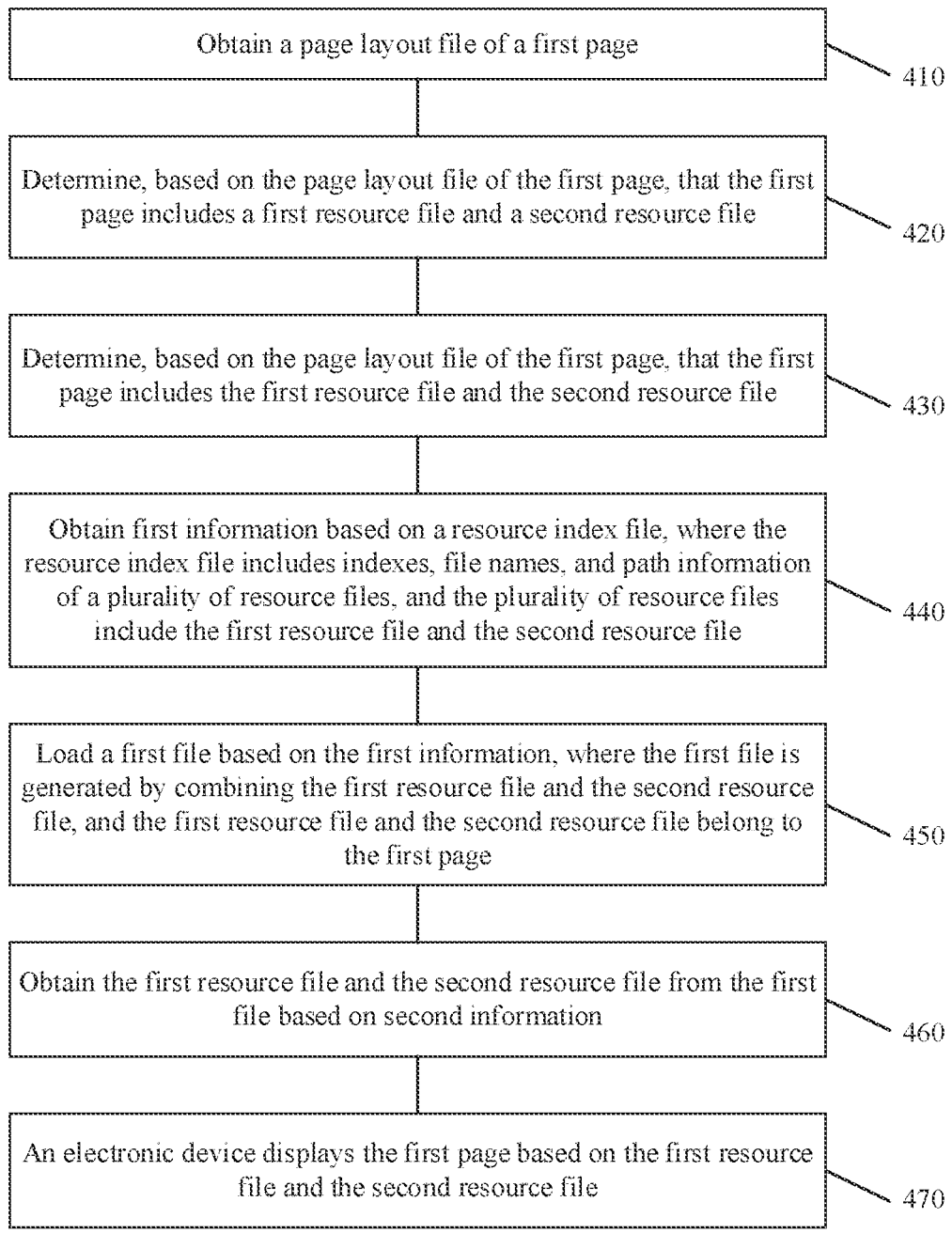

(a) in FIG. 3 is a schematic diagram of an application scenario of a file generation method according to an embodiment of this application;

(b) in FIG. 3 is a schematic diagram of another application scenario of a file generation method according to an embodiment of this application;

(c) in FIG. 3 is a schematic diagram of still another application scenario of a file generation method according to an embodiment of this application;

(d) in FIG. 3 is a schematic diagram of yet another application scenario of a file generation method according to an embodiment of this application;

FIG. 4 is a schematic flowchart of a file generation method according to an embodiment of this application;

(a) in FIG. 5 is a schematic diagram of a combination process of an original resource file according to an embodiment of this application;

(b) in FIG. 5 is a schematic diagram of a combination file according to an embodiment of this application;

(c) in FIG. 5 is a schematic diagram of an example of a resource index file according to an embodiment of this application;

(d) in FIG. 5 is a schematic diagram of another example of a resource index file according to an embodiment of this application;

FIG. 6 is a schematic diagram of another example combination process of an original resource file according to an embodiment of this application;

FIG. 7 is a schematic flowchart of a method according to an embodiment of this application;

FIG. 8 is a schematic diagram of an example loading process of an original resource file according to an embodiment of this application;

FIG. 9 is a schematic diagram of another example loading process of an original resource file according to an embodiment of this application;

FIG. 10 is a schematic diagram of still another example loading process of an original resource file according to an embodiment of this application; and FIG. 11 is another schematic flowchart of a method according to an embodiment of this application.

DESCRIPTION OF EMBODIMENTS

The following describes technical solutions in embodiments of this application with reference to the accompanying drawings in embodiments of this application. In the descriptions of embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions in embodiments of this application, "a plurality of" means two or more.

The terms "first" and "second" mentioned below are merely intended for a purpose of description, and shall not be understood as an indication or implication of relative importance or implicit indication of the number of indicated technical features. Therefore, a feature limited by "first" and "second" may explicitly or implicitly include one or more features, for example, "first resource file" and "second resource file" described in embodiments of this application.

An embodiment of this application provides a file generation method. In a compilation phase of an app, a page layout file corresponding to each page of the app is parsed, original resource files belonging to a same page are combined into one file, so that during page displaying, when the original resource files are loaded, a combination file is actually loaded, and the original resource files are sequentially and continuously read from the combination file. The original resource files do not need to be sequentially loaded during page displaying, thereby reducing a quantity of resource file loading times during page displaying, and improving a page display speed. In this embodiment of this application, a resource file existing before combination is referred to as an original resource file, and a resource file generated after the original resource files are combined is referred to as a combination file.

This embodiment of this application provides a method. During page displaying, the combination file is loaded, and the original resource files are sequentially obtained from the combination file. The original resource files do not need to be sequentially loaded during page displaying, thereby reducing a quantity of original resource file loading times during page displaying, and improving the page display speed.

The file generation method and the method provided in this embodiment of this application may be applied to an electronic device such as an augmented reality (augmented reality, AR)/virtual reality (virtual reality, VR) device, a mobile phone, a tablet computer, a wearable device, a vehicle-mounted device, a notebook computer, an ultra-mobile personal computer (ultra-mobile personal computer, UMPC), a netbook, or a personal digital assistant (personal digital assistant, PDA). A specific type of the electronic device is not limited in this embodiment of this application.

Before the method in this embodiment of this application is described, several related concepts are first described.

Page of an App

The page of the app may be understood as content displayed, when an electronic device detects an operation that a user opens the app, in a display interface of the electronic device in response to the operation; or may be content displayed, after the app is opened and when an electronic device detects an operation that a user switches a page, in a display interface of the electronic device in response to the operation.

Figure 1:
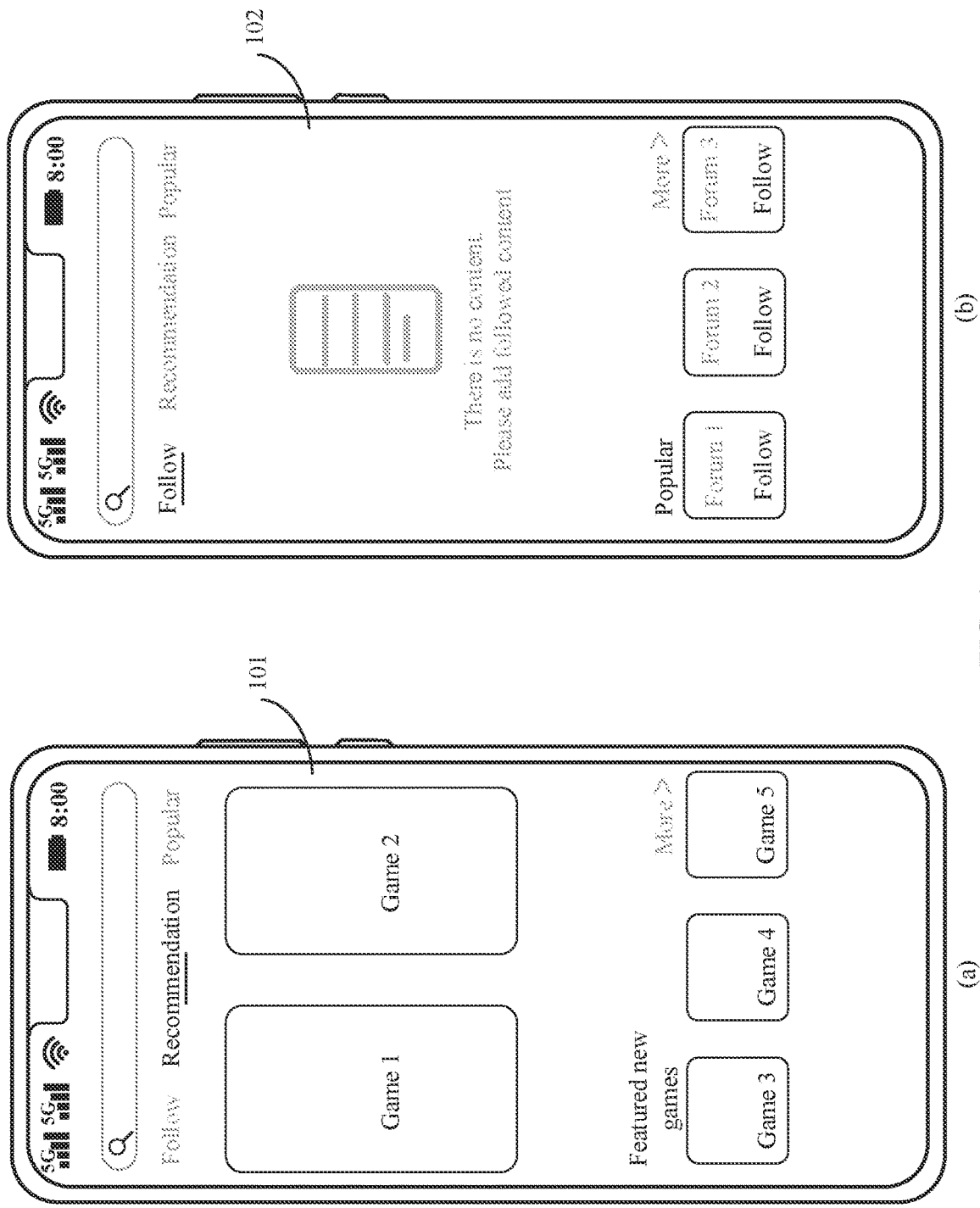
FIG. 1 is a schematic diagram of an interface according to an embodiment of this application.

For example, when the app is a Huawei game app, the page of the app may be understood as a home page of the Huawei game app displayed, when the electronic device detects an operation that the user opens the Huawei game app, in the display interface of the electronic device in response to the operation. Interface content 101 of the home page is shown in (a) in FIG. 1. Alternatively, the page of the app may be a follow page displayed, after the Huawei game app is opened and when the electronic device detects an operation that the user switches from the home page to the follow page, by the electronic device in response to the operation. Interface content 102 of the follow page is shown in (b) in FIG. 1.

Page Layout File of an App and a Resource File of the App

Both the page layout file and an original resource file are files introduced by a developer in a development process of the app. The page layout file is used to describe various types of original resource files required for displaying each page of the app. Each page corresponds to one page layout file. When an electronic device displays a corresponding page, the electronic device parses the page layout file, to determine an original resource file included in display of a current page, obtain the corresponding original resource file, and display the original resource file at a corresponding location on the page on a display of the electronic device.

The original resource file may be, for example, an image, a text, or the like included on the page of the app.

Resource Index File

After an app is developed, in a compilation phase of the app, an original resource file index may be generated for an original resource file referenced by the app, a file name of an original resource file referenced in a page layout file is replaced with an index of the original resource file, and a resource index file is generated based on the index, the file name, and path information of the original resource file.

It should be noted that, in embodiments of this application, the resource index file stores a file name of a combination file and path information of the combination file. For example, after 1.png and 4.xml are combined, a combination file 1-4.png is generated. In this case, a file name of 1.png and a file name of 4.xml each are a file name of the combination file. Therefore, a file name corresponding to an index of 1.png in the resource index file is the same as a file name corresponding to an index of 4.xml in the resource index file, and path information corresponding to the index of 1.png in the resource index file is the same as path information corresponding to the index of 4.xml in the resource index file.

In addition, an index may be further generated for the page layout file, and a resource index file is generated based on the index of the page layout file, a file name of the page layout file, and path information of the page layout file. It should be understood that, the resource index file generated for the page layout file and the resource index file generated for the resource file may be a same file, or may be different files. This is not limited in this embodiment of this application.

For example, when the app is a Huawei game app, when displaying a home page of the Huawei game app, the electronic device determines a file name and path information of a page layout file of a home page from a resource index file of the page layout file based on an obtained index of the page layout file; further obtains the page layout file; determines, based on the page layout file corresponding to the home page, an index of a resource file included on the home page; finds a file name and path information of a combination file from the resource index file based on the index; obtains the combination file; and finally completes displaying of the home page based on an original resource file obtained from the combination file.

Figure 2:
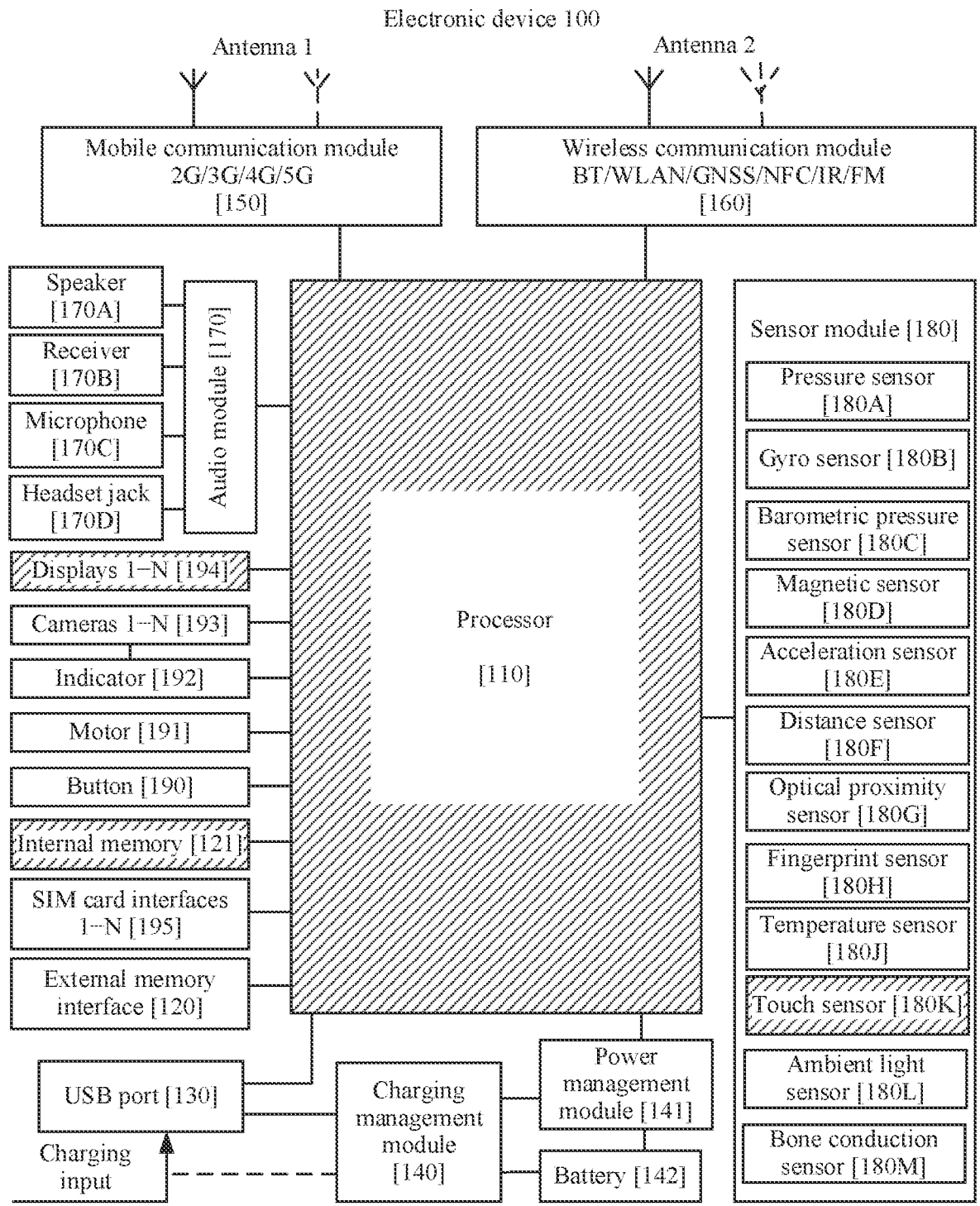
FIG. 2 is a schematic diagram of a structure of an electronic device according to an embodiment of this application.

For example, FIG. 2 is a schematic diagram of a structure of an electronic device 100 according to an embodiment of this application. The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure shown in this embodiment of this application does not constitute a specific limitation on the electronic device 100. In some other embodiments of this application, the electronic device 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 100. The controller may generate an operation control signal based on instruction operation code and a time sequence signal, and complete control of instruction fetching and instruction execution.

A memory may be further disposed in the processor 110, and is configured to store instructions and data. In some embodiments, the memory in the processor 110 is a cache. The memory may store instructions or data that is just used or is cyclically used by the processor 110. If the processor 110 needs to use the instructions or the data again, the processor 110 may directly invoke the instructions or the data from the memory. In this case, repeated access is avoided, a waiting time period of the processor 110 is reduced, and efficiency of a system is improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, a general purpose input/output (general-purpose input/output, GPIO) interface, a subscriber identity module (subscriber identity module, SIM) interface, a universal serial bus (universal serial bus, USB) port, and/or the like.

The I2C interface is a bidirectional synchronization serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call by using a Bluetooth headset.

The PCM interface may also be used for audio communication, to sample, quantize, and encode an analog signal. The UART interface is a universal serial data bus, and is used for asynchronous communication. The MIPI interface may be configured to connect the processor 110 and a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by using software. The GPIO interface may be configured as a control signal, or may be configured as a data signal. In some embodiments, the GPIO interface may be configured to connect the processor 110 and the camera 193, the display 194, the wireless communication module 160, the audio module 170, the sensor module 180, or the like. The GPIO interface may be further configured as the I2C interface, the I2S interface, the UART interface, the MIPI interface, or the like.

The USB port 130 is an interface that conforms to a USB standard specification, and may be specifically a mini USB port, a micro USB port, a USB Type C port, or the like. The USB port 130 may be configured to be connected to the charger to charge the electronic device 100, or may be configured to transmit data between the electronic device 100 and a peripheral device, or may be configured to be connected to a headset, to play audio by using the headset. The interface may be further configured to be connected to another electronic device, for example, an AR device.

It can be understood that an interface connection relationship between the modules that is shown in this embodiment of this application is merely an example for description, and does not constitute a limitation on the structure of the electronic device 100. In some other embodiments of this application, different interface connection manners in the foregoing embodiments or a combination of a plurality of interface connection manners may alternatively be used for the electronic device 100.

The charging management module 140 is configured to receive a charging input from the charger. The charger may be a wireless charger or a wired charger. While charging the battery 142, the charging management module 140 may further supply power to the electronic device by using the power management module 141.

The power management module 141 is configured to be connected to the battery 142, the charging management module 140, and the processor 110. The power management module 141 receives an input from the battery 142 and/or the charging management module 140, and supplies power to the processor 110, the internal memory 121, the external memory, the display 194, the camera 193, the wireless communication module 160, or the like. The power management module 141 may be further configured to monitor a parameter such as a battery capacity, a quantity of battery cycles, and a battery health status (leakage and impedance).

In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communication module 150, the wireless communication module 160, the modem processor, the baseband processor, or the like.

The electronic device 100 may implement a display function through the GPU, the display 194, the application processor, and the like. The GPU is a microprocessor for image processing, and is connected to the display 194 and the application processor. The GPU is configured to perform mathematical and geometric computation, and is configured to perform graphics rendering. The processor 110 may include one or more GPUs, and execute a program instruction to generate or change display information.

The display 194 is configured to display an image, a video, or the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a miniLED, a microLED, a micro-OLED, a quantum dot light emitting diode (quantum dot light emitting diodes, QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP, to convert the electrical signal into a digital image signal. The ISP outputs the digital image signal to the DSP for processing. The DSP converts the digital image signal into a standard image signal in a format of RGB, YUV, or the like. In some embodiments, the electronic device 100 may include one or N camera modules 193, where N is a positive integer greater than 1.

The digital signal processor is configured to process a digital signal, and may process another digital signal in addition to the digital image signal. The video codec is configured to compress or decompress a digital video. The NPU is a neural-network (neural-network, NN) computing processor. The NPU quickly processes input information by referring to a structure of a biological neural network, for example, a transfer mode between human brain neurons, and may further continuously perform self-learning. Applications such as intelligent cognition of the electronic device 100, for example, image recognition, facial recognition, speech recognition, and text understanding, may be implemented through the NPU.

The internal memory 121 may include one or more random access memories (random access memory, RAM) and one or more nonvolatile memories (non-volatile memory, NVM).

The random access memory may include a static random access memory (static random-access memory, SRAM), a dynamic random access memory (dynamic random access memory, DRAM), a synchronous dynamic random access memory (synchronous dynamic random access memory, SDRAM), a double data rate synchronous dynamic random access memory (double data rate synchronous dynamic random access memory, DDR SDRAM, where for example, a 5th generation DDR SDRAM is usually referred to as a DDR5 SDRAM), and the like.

The nonvolatile memory may include a magnetic disk storage device and a flash memory (flash memory).

The flash memory may include NOR FLASH, NAND FLASH, 3D NAND FLASH, and the like based on an operating principle; may include a single-level cell (single-level cell, SLC), a multi-level cell (multi-level cell, MLC), a triple-level cell (triple-level cell, TLC), a quad-level cell (quad-level cell, QLC), and the like based on an order of a level of a storage unit; and may include a universal flash storage (English: universal flash storage, UFS), an embedded multimedia card (embedded multimedia Card, eMMC), and the like based on a storage specification.

The random access memory may be directly read and written by the processor 110, and may be configured to store an executable program (for example, a machine instruction) of an operating system or another running program, and may be further configured to store data of a user and data of an application.

The nonvolatile memory may store an executable program, data of a user and an application, and the like, and may be loaded into the random access memory in advance, so that the processor 110 directly performs reading and writing. The external memory interface 120 may be configured to be connected to an external nonvolatile memory, to expand a storage capacity of the electronic device 100. The external nonvolatile memory communicates with the processor 110 through the external memory interface 120, to implement a data storage function. For example, a file such as music or a video is stored in the external nonvolatile memory.

The electronic device 100 may implement an audio function, for example, music playing or recording, by using the audio module 170, the speaker 170A, the receiver 170B, the microphone 170C, the headset jack 170D, the application processor, and the like. The button 190 of the electronic device 100 may include a power button, a volume button, and the like. The button 190 may be a mechanical button, or may be a touch button. The motor 191 may generate a vibration prompt. The motor 191 may be configured to provide an incoming call vibration prompt and a touch vibration feedback. The indicator 192 may be an indicator light, and may be configured to indicate a charging status and a power change, or may be configured to indicate a message, a missed call, a notification, and the like. The SIM card interface 195 is configured to be connected to a SIM card.

In addition, the electronic device 100 further includes various different sensors. For example, the pressure sensor 180A is configured to sense a pressure signal, and may convert the pressure signal into an electrical signal. The gyro sensor 180B may be configured to determine a moving posture of the electronic device 100. The barometric pressure sensor 180C is configured to measure barometric pressure. The magnetic sensor 180D includes a Hall sensor. The acceleration sensor 180E may detect acceleration values of the electronic device 100 in various directions (usually on three axes). The distance sensor 180F is configured to measure a distance. The electronic device 100 may measure the distance in an infrared manner or a laser manner. In some embodiments, in a photographing scenario, the electronic device 100 may measure a distance by using the distance sensor 180F, to implement quick focusing. The optical proximity sensor 180G may include, for example, a light emitting diode (LED) and an optical detector, for example, a photodiode. The ambient light sensor 180L is configured to sense ambient light brightness. The electronic device 100 may adaptively adjust brightness of the display 194 based on the sensed ambient light brightness. The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like. The touch sensor 180K is also referred to as a "touch panel". The touch sensor 180K may be disposed on the display 194, and the touch sensor 180K and the display 194 constitute a touchscreen, which is also referred to as a "touchscreen". The touch sensor 180K is configured to detect a touch operation performed on or near the touch sensor. The touch sensor may transfer the detected touch operation to the application processor, to determine a type of a touch event. The bone conduction sensor 180M may obtain a vibration signal.

In the following embodiments of this application, an electronic device having a structure shown in FIG. 2 is used as an example, and a Huawei game app is used as an example, to describe in detail a file generation method and a method provided in embodiments of this application.

An application scenario of a file generation method 200 is first described.

An application scenario is shown in (a) in FIG. 3. In a compilation phase of a Huawei game app, a developer may use a packaging tool. The packaging tool combines, in the method 200, original resource files referenced by the Huawei game app, and then uploads, to an application server, an executable file that is of the Huawei game app and that is generated after compilation. A user may download the Huawei game app from the application server to an electronic device. Another application scenario is shown in (b) in FIG. 3. After original code of a Huawei game app is uploaded to an application server, the application server compiles the original code of the Huawei game app, combines original resource files in the Huawei game app in the method 200 in a compilation phase, and finally generates an executable file of the Huawei game app. A user may download the Huawei game app from the application server to an electronic device. Still another application scenario is shown in (c) in FIG. 3. After compiling original code of a Huawei game app, a developer uploads, to a server, an executable file that is of the Huawei game app and that is generated after compilation. The server combines original resource files in the Huawei game app in the method 200. The user may download the Huawei game app from the application server to an electronic device. Yet another application scenario is shown in (d) in FIG. 3. After a user downloads a Huawei game app from an application server to an electronic device, the electronic device combines original resource files in the Huawei game app in the method 200. This is not limited in this embodiment of this application.

The following describes a file generation method 200 by using the application scenario shown in (a) in FIG. 3 as an example. FIG. 4 is a schematic flowchart of a file generation method 200. The method 200 includes the following steps.

Step 210: Obtain a page layout file of a first page.

Step 220: Determine, based on the page layout file of the first page, that the first page includes a first resource file and a second resource file.

Step 230: Combine the first resource file and the second resource file, to generate a first file.

In a compilation phase of a Huawei game app, a packaging tool determines, from all original resource files of the Huawei game app based on a page layout file corresponding to each page of the Huawei game app, original resource files belonging to a same page, and combines the original resource files belonging to the same page, to generate a combination file.

For example, in the compilation phase of the Huawei game app, the packaging tool respectively generates combination files based on identifiers that are of original resource files and that are included in three page layout files of the Huawei game app. The three page layout files respectively correspond to three pages of the Huawei game app, and the three pages are recorded as a page 1, a page 2, and a page 3.

The identifier that is of the original resource file and that is included in the page layout file may be, for example, a file name of the original resource file. For example, a page layout file of the page 1 includes the following code:

Resource1="1.png/"
Resource2="4.xml/"

A page layout file of the page 2 includes the following code:

Resource3="2.png/"
Resource4="5.xml/"

A page layout file of the page 3 includes the following code:

Resource5="6.jaon/"
Resource6="3.xml/"

Based on the foregoing code, it may be determined that an original resource file 1.png and an original resource file 4.xml belong to the page 1, an original resource file 2.png and an original resource file 5.xml belong to the page 2, and an original resource file 6.jaon and an original resource file 3.xml belong to the page 3. The original resource file 1.png and the original resource file 4.xml may be combined into one file, the original resource file 2.png and the original resource file 5.xml may be combined into one file, and the original resource file 3.xml and the original resource file 6.jaon may be combined into one file. For example, during combination of original resource files, the original resource file 1.png and the original resource file 4.xml may be placed in a combination file named 1-4.png, the original resource file 2.png and the original resource file 5.xml may be placed in a file named 2-5.png, the original resource file 3.xml and the original resource file 6.jaon may be placed in a file named 3-6.xml. A combination process is shown in (a) in FIG. 5.

The first page in the method 200 may correspond to any one of the page 1, the page 2, and the page 3. For the page 1, the first resource file may correspond to 1.png, the second resource file may correspond to 4.xml, and the first file may correspond to the file generated after 1.png and 4.xml are combined. For the page 2, the first resource file may correspond to 2.png, the second resource file may correspond to 5.xml, and the first file may correspond to the file generated after 2.png and 5.xml are combined. For the page 3, the first resource file may correspond to 3.xml, the second resource file may correspond to 6.jaon, and the first file may correspond to the file generated after 3.xml and 6.jaon are combined.

After the first resource file and the second resource file are combined into the first file, in order that the first resource file and the second resource file can be accurately found from the first file during page displaying, an offset (offset) of a start location of the first resource file relative to a start location of the first file and a length (length) of the first resource file need to be learned of, and an offset of a start location of the second resource file relative to the start location of the first file and a length of the second resource file need to be learned of.

To achieve this objective, in an implementation, the offset of the start location of the first resource file relative to the start location of the first file and the offset of the start location of the second resource file relative to the start location of the first file may be recorded when the first file is generated. It should be noted that the following provides description based on a case in which the offset of the start location of the first resource file relative to the start location of the first file is less than the offset of the start location of the second resource file relative to the start location of the first file. In other words, when the first file is generated, the first resource file may be first placed in the first file, and then the second resource file is appended to the first resource file.

It is assumed that a user installs the Huawei game app on an electronic device. During page displaying, the Huawei game app may determine the start location of the first resource file based on the offset of the start location of the first resource file relative to the start location of the first file, and determine the length of the first resource file based on a difference between the offset of the start location of the first resource file relative to the start location of the first file and the offset of the start location of the second resource file relative to the start location of the first file, to obtain the first resource file from the first file.

The Huawei game app may determine the start location of the second resource file based on the offset of the start location of the second resource file relative to the start location of the first file. Because the first file includes only the first resource file and the second resource file, all remaining files starting from the start location of the second resource file in the first file may be used as the second resource file and obtained, and finally, page displaying is performed based on the first resource file and the second resource file.

In another implementation, the length of the first resource file and the length of the second resource file may be recorded when the first file is generated.

It is assumed that the user installs the Huawei game app on the electronic device. During page displaying, the Huawei game app may determine a start location of the second resource file based on the length of the first resource file, and obtain the first resource file from the first file based on the length of the second resource file.

Assuming that the offset of the start location of the first resource file relative to the start location of the first file is 0, the Huawei game app may obtain the first resource file from the first file based on the length of the first resource file, and finally, perform page displaying based on the first resource file and the second resource file.

In still another implementation, the offset of the start location of the first resource file relative to the start location of the first file, the offset of the start location of the second resource file relative to the start location of the first file, the length of the first resource file, and the length of the second resource file may be recorded when the first file is generated.

It should be noted that, when original resource files are combined, a gap may exist between two original resource files. In other words, the start location of the second resource file is not adjacent to an end location of the first resource file, but instead, a gap exists between the start location of the second resource file and the end location of the first resource file, or other data is stored between the two original resource files. In this case, when the offset of the start location of the second resource file relative to the start location of the first file is determined based on the length of the first resource file, a length of the gap between the end location of the first resource file and the start location of the second resource file needs to be considered; or when the length of the first resource file is determined based on the offset of the start location of the first resource file relative to the start location of the first file and the offset of the start location of the second resource file relative to the start location of the first file, a length of the gap between the end location of the first resource file and the start location of the second resource file needs to be considered.

Optionally, information recorded when the first file is generated may be stored in the first file. Herein, it is assumed that information recorded when first information is generated includes the offset of the start location of the first resource file relative to the start location of the first file, the offset of the start location of the second resource file relative to the start location of the first file, the length of the first resource file, and the length of the second resource file.

For example, as shown in (b) in FIG. 5, 1.png and 4.xml are in a combination file of the page 1. An offset of 1.png in the combination file, a length of 1.png, and an index of 1.png may be stored in the combination file of the page 1 as a whole, and an offset of 4.xml in the combination file, the length of 1.png, and the index of 1.png are stored in the combination file of the page 1.

2.png and 5.xml are in a combination file of the page 2. An offset of 2.png in the combination file, a length of 2.png, and an index of 2.png may be stored in the combination file of the page 2 as a whole, and an offset of 5.xml in the combination file, a length of 5.xml, and an index of 5.xml are stored in the combination file of the page 2 as a whole.

3.xml and 6.jaon are in a combination file of the page 3. An offset of 3.xml in the combination file, a length of 3.xml, and an index of 3.xml may be stored in the combination of the page 3 as a whole, and an offset of 6.jaon in the combination file, a length of 6.jaon, and an index of 6.jaon are stored in the combination file of the page 3 as a whole.

An index of the original resource file, an offset of the original resource file in the combination file, and a length of the original resource file are stored in the combination file as a whole, so that the electronic device can determine, in a page displaying phase based on the index of the original resource file, the offset and the length that correspond to the original resource file. For example, in the page displaying phase, the electronic device may determine, in the combination file, the offset of 1.png in the combination file and the length of 1.png based on ID001, and may determine the offset of 4.xml in the combination file and the length of 4.xml based on ID004.

It should be noted that the index that is of the original resource file and that is stored in the combination file may alternatively be another identifier that can indicate the original resource file, for example, may be the file name of the original resource file. This is not limited in this embodiment of this application.

Optionally, the information recorded when the first file is generated may be stored in a resource index file. Herein, it is assumed that information recorded when first information is generated includes the offset of the start location of the first resource file relative to the start location of the first file, the offset of the start location of the second resource file relative to the start location of the first file, the length of the first resource file, and the length of the second resource file.

It is assumed that the original resource files referenced by the Huawei game app include 1.png, 2.png, 3.png, 4.xml, 5.xml, and 6.jaon. In a compilation phase, resource index files generated for 1.png, 2.png, 3.png, 5.xml, and 6.jaon are shown in (c) in FIG. 5. In (c) in FIG. 5, ID001, ID002, ID003, ID004, ID005, and ID006 are respectively indexes generated for 1.png, 2.png, 3.png, 4.xml, 5.xml, and 6.jaon. It should be noted that a file name and path information of each combination file are not shown in (c) in FIG. 5.

For example, 1.png and 4.xml are in a combination file of the page 1. An offset of 1.png in the combination file and a length of 1.png may be stored in an index relationship corresponding to the index ID001 of 1.png, and an offset of 4.xml in the combination file and a length of 4.xml may be stored in an index relationship corresponding to the index ID004 of 4.xml. For example, 2.png and 5.xml are in a combination file of the page 2. An offset of 2.png in the combination file and a length of 2.png may be stored in an index relationship corresponding to ID002, and an offset of 5.xml in the combination file and a length of 5.xml may be stored in an index relationship corresponding to ID005. For example, 3.xml and 6.jaon are in a combination file of the page 3. An offset of 3.xml in the combination file and a length of 3.xml may be stored in an index relationship corresponding to ID003, and an offset of 6.jaon in the combination file and a length of 6.jaon may be stored in an index relationship corresponding to ID006. A resource index file that stores the offset of the original resource file in the combination file and the length of the original resource file is shown in (d) in FIG. 5.

That the offset of the original resource file in the combination file and the length of the original resource file are stored in an index relationship corresponding to the index of the original resource file may be understood as follows: The offset of the original resource file in the combination file and the length of the original resource file are stored in the resource index file as a whole.

It should be noted that, in a specific implementation, each page may include one page layout file, or each page may include two or more page layout files. For example, for the page 1, the page layout file of the page 1 may include the following code:

Resource1="1.png/"
Include="1"

Based on the foregoing code, it may be determined that the original resource file 1.png belongs to the page 1, and it may be further determined that the page 1 further includes a page layout file whose index is 1. Therefore, another original resource file included on the page 1 may be further determined based on the page layout file whose index is 1. For example, the page layout file whose index is 1 includes the following code:

Resource2="4.xml/"

Based on the foregoing code, it may be determined that the original resource file 4.xml also belongs to the page 1. Therefore, the original resource file 1.png and the original resource file 4.xml may be combined into one file.

It should be noted that the foregoing describes the method 200 only using an example in which one page includes two original resource files. However, a quantity of original resource files included on the page is not limited in this embodiment of this application. The method 200 is also applicable to a case in which one page includes a plurality of original resource files.

In this embodiment of this application, original resource files of different pages that have an association relationship may be further combined to generate a combination file. The following describes the method.

In the compilation phase of the Huawei game app, the packaging tool determines, from the original resource file based on the page layout file of the page, the original resource files belonging to different pages that have an association relationship, and combines the original resource files to generate one combination file.

For example, in the compilation phase of the Huawei game app, the packaging tool respectively generates combination files based on the three page layout files of the Huawei game app. The three page layout files respectively correspond to the three pages of the Huawei game app, and the three pages are recorded as a page 4, a page 5, and a page 6.

For example, a page layout file of the page 4 includes the following code:

Related="5"
Resource7="1.png/"
Resource8="5.xml/"

A page layout file of the page 5 includes the following code:

Related="4"
Resource9="2.png/"
Resource10="6.jaon/"

A page layout file of the page 6 includes the following code:

Resource11="3.png/"
Resource12="4.xml/"

Based on the foregoing code, it may be determined that the page 4 and the page 5 are pages that have an association relationship, and it is determined that the original resource file 1.png and the original resource file 5.xml belong to the page 4, that the original resource file 2.png and the original resource file 6.jaon belong to the page 5, and that the original resource file 3.png and the original resource file 4.xml belong to the page 6.

Therefore, during combination of original resource files, the original resource file 1.png, the original resource file 5.xml, the original resource file 2.png, and the original resource file 6.jaon may be combined into one file, and the original resource file 3.png and the original resource file 4.xml may be combined into one file. For example, during combination of resource files, the original resource file 1.png, the original resource file 5.xml, the original resource file 2.png, and the original resource file 6.jaon may be placed in file named 1-2-5-6.png. A combination process is shown in FIG. 6.

Pages that have an association relationship may be usually pages that are successively displayed after the app is opened.

For example, the page 4 and the page 5 may be respectively, for example, a welcome page and a home page that are displayed after the Huawei game app is opened. Alternatively, pages that have an association relationship may be, for example, a page determined based on an operation habit of the user. For example, after the Huawei game app is opened, the home page is displayed to the user. Based on the operation habit of the user, the user usually performs an operation of switching from the home page to a follow page. In this case, the page 4 and the page 5 may be respectively, for example, the home page and the follow page that are displayed after the Huawei game app is opened.

To accelerate a display speed of the electronic device, in the page layout file of the page 4, Related="5" may be used to state that the page 4 and the page 5 have an association relationship, and in the page layout file of the page 5, Related="4" may be used to state that the page 5 and the page 4 have an association relationship, so that in the compilation phase, the packaging tool may determine, based on the page layout file of the page 4 and the page layout file of the page 5, that the page 4 and the page 5 have an association relationship, and combine original resource files referenced in the page layout files of the two pages into one file.

It should be noted that another description in the method 200 is also applicable to the method. For details, refer to related descriptions in the method 200. For brevity, details are not described herein again.

In this embodiment of this application, for a case in which a plurality of original resource files need to be combined to generate one combination file, because a size of the combination file affects a loading speed, factor of a length of the combination file may be considered duration generation of the combination file.

For example, it may be specified that the length of the combination file is less than or equal to a preset threshold. If the length of the combination file is greater than the preset threshold, the combination file may be split into at least two files, so that the length of the combination file meets a requirement.

For example, a length of a combination file generated after 1.png, 4.xml, 7.png, and 8.xml are combined is 120 KB. It is assumed that the preset threshold is 64 KB. Because the length of the combination file is greater than 64 KB, the combination file may be split into at least two files that meet a requirement. For example, 1.png and 4.xml may be combined into one file, and 7.png and 8.xml may be combined into one file. In other words, the original resource files 1.png, 4.xml, 7.png, and 8.xml are combined into two files, so that lengths of the combination files meet a requirement.

Further, when the plurality of original resource files are combined into the at least two files, files in a same format may be combined into a same resource file. For example, 1.png and 7.png may be combined into one file, and 4.xml and 8.xml may be combined into one resource file.

The foregoing describes a method for generating a combination file in a compilation phase. A purpose of combination is to accelerate a page display speed after an app is opened. The following describes a method 300 that is provided in an embodiment of this application and that is used after the app is opened.

When a user opens an app on an electronic device or a user performs a page switching operation after an app is opened, the electronic device displays a corresponding page to the user based on an operation performed by the user.

For example, the user opens a Huawei game app on the electronic device. In this case, a page that needs to be displayed by the electronic device to the user may be a home page of the Huawei game app, and interface content 101 of the home page is shown in (a) in FIG. 1. Alternatively, the user performs, on the interface content 101, an operation of switching from a home page to a follow page. For example, the user taps an option of Interest on the interface content 101. In this case, the electronic device needs to display the follow page to the user. Interface content 102 of the follow page is shown in (b) in FIG. 1.

FIG. 7 is a schematic flowchart of a method 300 according to an embodiment of this application. The method 300 includes the following steps. It should be noted that a file loading process in this embodiment of this application may be a process in which a file is first read from a nonvolatile memory and then the read file is stored in a random access memory. A combination file is read from the nonvolatile memory and stored in the random access memory, so that original resource files can be continuously read from the combination file.

Step 310: Obtain first information based on a resource index file; where the resource index file includes indexes, file names, and path information of a plurality of resource files, the plurality of resource files include a first resource file and a second resource file, and the first information includes path information and a file name of a first file.

Step 320: Load the first file based on the first information, where the first file is generated by combining the first resource file and the second resource file, and the first resource file and the second resource file belong to a first page.

Step 330: Obtain the first resource file and the second resource file from the first file based on second information, where the second information is used to extract the first resource file and the second resource file from the first resource file.

Step 340: An electronic device displays the first page based on the first resource file and the second resource file.

The following describes scenarios of a resource loading method 300 provided in this embodiment of this application by using an example in which the electronic device displays a home page or displays a home page and a follow page.

Scenario 1: In a compilation phase, two original resource files included on the home page are combined into one file.

For example, as shown in FIG. 8, when displaying the home page, the electronic device parses a page layout file of the home page, determines that indexes of original resource files included on the home page are ID001 and ID004, and then sequentially loads an original resource file corresponding to ID001 and an original resource file corresponding to ID004, to display the home page.

For example, it is assumed that the electronic device first loads the original resource file corresponding to ID001. Because in the compilation phase, an original resource file 1.png corresponding to ID001 and an original resource file 4.xml corresponding to ID004 that are included on the home page are combined into one file, when the original resource file corresponding to ID001 is loaded, a combination file is actually loaded.

When loading the original resource file corresponding to ID001, the electronic device determines, based on the resource index file, a file name and path information that correspond to ID001. The file name and the path information are a file name and path information of the combination file, and the electronic device loads the combination file based on the file name and the path information.

After completing loading of the combination file, the electronic device needs to read, from the combination file, the original resource file corresponding to ID001. In this case, the electronic device may read the original resource file corresponding to ID001 from the combination file based on a determined offset of the original resource file corresponding to ID001 in the combination file and a determined length of the original resource file corresponding to ID001, and display the home page based on the original resource file corresponding to ID001. For a method for determining the offset of the original resource file corresponding to ID001 in the combination file and the length of the original resource file corresponding to ID001, refer to related descriptions in the method 200. For brevity, details are not described herein again.

When loading the original resource file corresponding to ID004, the electronic device determines, based on the resource index file, a file name and path information that correspond to ID004. Herein, the file name and the path information that are determined from the resource index file based on ID004 are the same as the file name and the path information that are determined from the resource index file based on ID001. When loading the original resource file corresponding to ID004, the electronic device actually loads the combination file. However, because the combination file is loaded when the original resource file corresponding to ID001 is loaded, the electronic device may ignore current loading, directly read the original resource file corresponding to ID004 from the loaded combination file, and display the home page based on the original resource file corresponding to ID004.

It should be noted that, after the combination file is loaded, release of loaded content is delayed. In other words, after the combination file is loaded, the loaded content is not released immediately. Instead, the loaded content may be released only after all original resource files in the combination file are read.

For example, an obtained original resource file may be marked in the combination file. After all the original resources in the combination file are marked, it indicates that all the original resource files in the combination file are read. In this case, the combination file may be released.

In the method 300, the first page may correspond to the home page, the first resource file may correspond to the original resource file corresponding to ID001, the second resource file may correspond to the original resource file corresponding to ID004, the first file may correspond to the file generated after the original resource file corresponding to ID001 and the original resource file corresponding to ID004 are combined, the first information may correspond to the file name and the path information of the combination file, and the first file may correspond to the combination file. Scenario 2: In a compilation phase, a plurality of original resource files included on the home page are combined into one file.

For example, as shown in FIG. 9, when displaying the home page, the electronic device parses a page layout file of the home page, determines that indexes of original resource files included on the home page are ID001, ID002, ID004, and ID006, and then sequentially loads an original resource file corresponding to ID001, an original resource file corresponding to ID002, an original resource file corresponding to ID004, and an original resource file corresponding to ID006, to display the home page.

For example, it is assumed that the electronic device first loads the original resource file corresponding to ID001. Because in the compilation phase, an original resource file 1.png corresponding to ID001, an original resource file 2.png corresponding to ID002, an original resource file 4.xml corresponding to ID004, and an original resource file 6.json corresponding to ID006 that are included on the home page are combined into one file, when the original resource file corresponding to ID001 is loaded, a combination file is actually loaded.

When loading the original resource file corresponding to ID001, the electronic device determines, based on the resource index file, a file name and path information that correspond to ID001. The file name and the path information are a file name and path information of the combination file, and the electronic device loads the combination file based on the file name and the path information.

After completing loading of the combination file, the electronic device needs to read, from the combination file, the original resource file corresponding to ID001. In this case, the electronic device may read the original resource file corresponding to ID001 from the combination file based on a determined offset of the original resource file corresponding to ID001 in the combination file and a determined length of the original resource file corresponding to ID001, and display the home page based on the original resource file corresponding to ID001. For a method for determining the offset of the original resource file corresponding to ID001 in the combination file and the length of the original resource file corresponding to ID001, refer to related descriptions in the method 200. For brevity, details are not described herein again.

The following briefly describes a loading process of another original resource file of the home page by using a loading process of the original resource file corresponding to ID002 as an example.

When loading the original resource file corresponding to ID002, the electronic device determines, based on the resource index file, a file name and path information that correspond to ID002. Herein, the file name and the path information that are determined from the resource index file based on ID002 are the same as the file name and the path information that are determined from the resource index file based on ID001. When loading the original resource file corresponding to ID002, the electronic device actually loads the combination file. However, because the combination file is loaded when the original resource file corresponding to ID001 is loaded, the electronic device may ignore current loading, directly read the original resource file corresponding to ID002 from the loaded combination file, and display the home page based on the original resource file corresponding to ID002.

For a method in which the electronic device reads the original resource file corresponding to ID002 in the combination file, refer to the foregoing method for reading the original resource file corresponding to ID001 in the combination file. For a method for loading the original resource file corresponding to ID004 and a method for loading the original resource file corresponding to ID006, refer to a loading process of the original resource file corresponding to ID004 in Scenario 1, or refer to a loading process of the original resource file corresponding to ID002 in Scenario 2. For brevity, details are not described herein again.

It should be noted that, after the combination file is loaded, release of loaded content is delayed. In other words, after the combination file is loaded, the loaded content is not released immediately. Instead, the loaded content may be released only after all original resource files in the combination file are read.

For example, an obtained original resource file may be marked in the combination file. After all the original resources in the combination file are marked, it indicates that all the original resource files in the combination file are read. In this case, the combination file may be released.

Scenario 3: in a compilation phase, original resource files of pages having an association relationship are combined into one file. The pages having an association relationship may be, for example, a home page and a follow page.

For example, as shown in FIG. 10, when displaying the home page, the electronic device parses a page layout file of the home page, determines that indexes of resource files included on the home page are ID001 and ID005, and then sequentially loads an original resource file corresponding to ID001 and an original resource file corresponding to ID005, to display the home page.

For example, it is assumed that the electronic device first loads the original resource file corresponding to ID001. Because in the compilation phase, an original resource file 1.png and an original resource file 5.xml that are included on the home page and an original resource file 2.png and an original resource file 6.jaon that are included on the home page are combined into one file, when the original resource file corresponding to ID001 is loaded, a combination file is actually loaded.

When loading the original resource file corresponding to ID001, the electronic device determines, based on the resource index file, a file name and path information that correspond to ID001. The file name and the path information are a file name and path information of the combination file, and the electronic device loads the combination file based on the file name and the path information.

After completing loading of the combination file, the electronic device needs to read, from the combination file, the original resource file corresponding to ID001. In this case, the electronic device may read the original resource file corresponding to ID001 from the combination file based on a determined offset of the original resource file corresponding to ID001 in the combination file and a determined length of the original resource file corresponding to ID001, and display the home page based on the original resource file corresponding to ID001. For a method for determining the offset of the original resource file corresponding to ID001 in the combination file and the length of the original resource file corresponding to ID001, refer to related descriptions in the method 200. For brevity, details are not described herein again.

For a loading process of another original resource file included on the home page, namely, the original resource file corresponding to ID005, refer to the loading process of the original resource file corresponding to ID004 in the scenario 1, or refer to the loading process of the original resource file corresponding to ID002 in the scenario 2. For brevity, details are not described herein again.

After the home page is displayed, the user performs an operation of switching from the home page to the follow page. In this case, the electronic device needs to display the follow page. To display the follow page, the electronic device parses a page layout file of the follow page, determines that indexes of resource files included on the follow page are ID002 and ID006, and then sequentially loads the original resource files corresponding to ID002 and ID006, to display the follow page.

For example, it is assumed that the electronic device first loads the original resource file corresponding to ID002. The electronic device determines, based on the resource index file, a file name and path information that correspond to ID002. Herein, the file name and the path information that are determined from the resource index file based on ID002 are the same as the file name and the path information that are determined from the resource index file based on ID001. When loading the original resource file corresponding to ID002, the electronic device actually loads the combination file. However, because the combination file is loaded when the original resource file corresponding to ID001 is loaded, the electronic device may ignore current loading, directly read the original resource file corresponding to ID002 from the loaded combination file, and display the follow page based on the original resource file corresponding to ID002.

For a method in which the electronic device reads the original resource file corresponding to ID002 in the combination file, refer to the foregoing method for reading the original resource file corresponding to ID001 in the combination file. For a loading process of the original resource file corresponding to ID006, refer to the loading process of the original resource file corresponding to ID004 in Scenario 1, or refer to the loading process of the original resource file corresponding to ID002 in Scenario 2. For brevity, details are not described herein again.

It should be noted that, after the combination file is loaded, release of loaded content is delayed. In other words, after the combination file is loaded, the loaded content is not released immediately. Instead, the loaded content may be released only after all original resource files in the combination file are read.

For example, an obtained original resource file may be marked in the combination file. After all the original resources in the combination file are marked, it indicates that all the original resource files in the combination file are read. In this case, the combination file may be released.

It should be understood that a loading sequence used in Scenario 1 to Scenario 3 is merely used as an example for description, and does not constitute any limitation on this embodiment of this application. In a specific implementation, a loading sequence of the original resource files is not limited.

FIG. 11 is a schematic flowchart of another method 400 according to an embodiment of this application. The method 400 includes the following steps.

Step 410: Obtain a page layout file of a first page.

Step 420: Determine, based on the page layout file of the first page, that the first page includes a first resource file and a second resource file.

Step 430: Combine the first resource file and the second resource file, to generate a first file.

Step 440: Obtain first information based on a resource index file, where the resource index file includes indexes, file names, and path information of a plurality of resource files, the plurality of resource files include the first resource file and the second resource file, and the first information includes path information and a file name of a first file.

Step 450: Load the first file based on the first information.

Step 460: Obtain the first resource file and the second resource file from the first file based on second information, where the second information is used to extract the first resource file and the second resource file from the first resource file.

Step 470: An electronic device displays the first page based on the first resource file and the second resource file.

For a specific implementation of steps 410 to 430, refer to related descriptions in the method 200. For a specific implementation of steps 440 to 470, refer to related descriptions in the method 300. For brevity, details are not described herein again.

In addition, an embodiment of this application further provides a file. The file includes a resource index file and a first file.

For more specific descriptions of the resource index file and the first file in the file, refer to the foregoing related descriptions. For brevity, details are not described herein again. It may be understood that, to implement the foregoing functions, the electronic device includes a hardware module and/or a software module for performing a corresponding function. Algorithm steps in the examples described with reference to embodiments disclosed in this specification can be implemented in a form of hardware or a combination of hardware and computer software in this application. Whether a function is performed by using hardware or hardware driven by computer software depends on a particular application and design constraint of the technical solutions. A person skilled in the art may use different methods to implement the described functions for each particular application, but it should not be considered that the implementation goes beyond the scope of this application.

In this embodiment, the electronic device may be divided into functional modules based on the foregoing method examples. For example, each functional module may be obtained through division for each corresponding function, for example, a processing module and a display module, or two or more functions may be integrated into one processing module. The integrated module may be implemented in a form of hardware. It should be noted that, in embodiments, division into the modules is an example and is merely logical function division, and may be other division in an actual implementation.

It should be noted that, all related content of the steps in the method embodiments may be cited in function descriptions of corresponding functional modules. Details are not described herein again.

The electronic device provided in this embodiment is configured to execute the foregoing file generation method, and therefore, can achieve a same effect as the foregoing implementation method.

When an integrated unit is used, the electronic device may further include a processing module, a storage module, and a communication module. The processing module may be configured to control and manage an action of the electronic device. The storage module may be configured to support the electronic device to store program code, data, and the like. The communication module may be configured to support the electronic device to communicate with another device.

The processing module may be a processor or a controller. The processing module may implement or execute logical blocks, modules, and circuits in various examples described with reference to content disclosed in this application. The processor may alternatively be a combination implementing a computing function, for example, include a combination of one or more microprocessors, or a combination of digital signal processing (digital signal processing, DSP) and a microprocessor. The storage module may be a memory. The communication module may be specifically a device that interacts with another electronic device, for example, a radio frequency circuit, a bluetooth chip, or a Wi-Fi chip.

In an embodiment, when the processing module is a processor, and the storage module is a memory, the electronic device in this embodiment may be a device having the structure shown in FIG. 2.

An embodiment further provides a computer storage medium. The computer storage medium stores computer instructions. When the computer instructions run on an electronic device, the electronic device is enabled to perform the foregoing related method steps to implement the file generation method in the foregoing embodiments.

An embodiment further provides a computer program product. When the computer program product runs on a computer, the computer is enabled to perform the foregoing related steps, to implement the file generation method in the foregoing embodiments.

In addition, an embodiment of this application further provides an apparatus. The apparatus may be specifically a chip, a component, or a module, and the apparatus may include a processor and a memory that are connected. The memory is configured to store computer-executable instructions. When the apparatus runs, the processor may execute the computer-executable instructions stored in the memory, so that the chip performs the file generation method in the foregoing method embodiments.

The electronic device, the computer storage medium, the computer program product, or the chip provided in embodiments are all configured to perform the foregoing provided corresponding method. Therefore, for a beneficial effect that can be achieved by the electronic device, the computer storage medium, the computer program product, or the chip, refer to the beneficial effect in the foregoing provided corresponding method. Details are not described herein again.

Based on the descriptions of the implementations, a person skilled in the art may understand that for the purpose of convenient and brief descriptions, division into the functional modules is merely used as an example for description. In an actual application, the functions can be allocated to different functional modules for implementation based on a requirement. In other words, an inner structure of an apparatus is divided into different functional modules, to implement all or some of the foregoing described functions.

In the several embodiments provided in this application, it should be understood that the disclosed apparatus and method may be implemented in another manner. For example, the described apparatus embodiments are merely an example. For example, division into modules or units is merely logical function division, and may be other division in an actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated units may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes various medium that can store program code such as a USB flash drive, a removable hard disk, a read-only memory (read only memory, ROM), a random access memory (random access memory, RAM), a magnetic disk, or an optical disc.

The foregoing content is merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
obtaining a combination file;
comparing a length of the combination file to a preset threshold;
splitting, in response to the length of the combination file being greater than the preset threshold, the combination file into at least two files having lengths less than or equal to the preset threshold, wherein the at least two files comprise a first file and a second file, wherein resource files in the first file are of a first content type, and wherein resource files in the second file are of a second content type;
obtaining first information based on a resource index file, wherein the resource index file comprises indexes, file names, and first path information of resource files, wherein the resource files comprise a first resource file and a second resource file, wherein the first information comprises second path information of the first file and a file name of the first file, wherein the first file is based on the first resource file and the second resource file that are each of the first content type, and wherein the first resource file and the second resource file belong to a first page;
loading the first file based on the first information;
obtaining the first resource file and the second resource file from the first file by using second information to extract the first resource file and the second resource file from the first file; and
displaying the first page based on the first resource file and the second resource file.

2. The method of claim 1, wherein the second information comprises a first offset of a first start location of the first resource file relative to a second start location of the first file and a second offset of a third start location of the second resource file relative to the second start location.

3. The method of claim 1, wherein the second information comprises a first length of the first resource file and a second length of the second resource file.

4. The method of claim 1, wherein the second information is stored in the first file or the resource index file.

5. The method of claim 1, wherein the second file is based on a third resource file and a fourth resource file that are each of the second content type that is different from the first content type.

6. The method of claim 1, wherein the preset threshold is 64 kilobytes.

7. A method, comprising:
obtaining a page layout file of a first page;
identifying, based on the page layout file, that the first page comprises a first resource file and a second resource file of a first content type and comprises a third resource file and a fourth resource file of a second content type;
combining the first resource file, the second resource file, the third resource file, and the fourth resource file to generate a combination file;
comparing a length of the combination file to a preset threshold; and
splitting, in response to the length of the combination file being greater than the preset threshold, the combination file into at least two files having lengths less than or equal to the preset threshold,
wherein a first file of the at least two files includes resource files of the first content type, and
wherein a second file of the at least two files includes resource files of the second content type.

8. The method of claim 7, wherein identifying that the first page comprises the first resource file and the second resource file comprises identifying, based on a first identifier of the first resource file and a second identifier of the second resource file that are comprised in the page layout file, that the first resource file and the second resource file belong to the first page.

9. The method of claim 7, wherein the first file comprises:
a first offset of a first start location of the first resource file relative to a second start location of the first file and a second offset of a third start location of the second resource file relative to the second start location; or
a first length of the first resource file and a second length of the second resource file.

10. The method of claim 7, further comprising generating a resource index file comprising indexes, file names, and first path information of resource files, wherein the resource files comprise the first resource file and the second resource file.

11. The method of claim 10, wherein the resource index file comprises a first offset of a first start location of the first resource file relative to a second start location of the first file and a second offset of a third start location of the second resource file relative to the second start location, or wherein the first file comprises a first length of the first resource file and a second length of the second resource file.

12. The method of claim 7, further comprising identifying the first resource file and the second resource file based on at least one page layout file of the first page.

13. The method of claim 7, wherein the first content type comprises a graphics type and the second content type comprises a data type.

14. The method of claim 7, wherein the preset threshold is 64 kilobytes.

15. An apparatus, comprising:
a display; and
one or more processors coupled to the display and configured to:
obtain a combination file;
compare a length of the combination file to a preset threshold;
split, in response to the length of the combination file being greater than the preset threshold, the combination file into at least two files having lengths less than or equal to the preset threshold, wherein the at least two files comprise a first file and a second file, wherein resource files in the first file are of a first content type, and wherein resource files in the second file are of a second content type;

obtain first information based on a resource index file, wherein the resource index file comprises indexes, file names, and first path information of resource files, wherein the resource files comprise a first resource file and a second resource file, wherein the first information comprises second path information of the first file and a file name of the first file, wherein the first file is based on the first resource file and the second resource file that are each of the first content type, and wherein the first resource file and the second resource file belong to a first page;

load the first file based on the first information;

obtain the first resource file and the second resource file from the first file by using second information to extract the first resource file and the second resource file from the first file; and display, using the display, the first page based on the first resource file and the second resource file.

16. The apparatus of claim 15, wherein the second information comprises a first offset of a first start location of the first resource file relative to a second start location of the first file and a second offset of a third start location of the second resource file relative to the second start location.

17. The apparatus of claim 15, wherein the second information comprises a first length of the first resource file and a second length of the second resource file.

18. The apparatus of claim 15, wherein the second information is stored in the first file or the resource index file.

19. The apparatus of claim 15, wherein the second file is based on a third resource file and a fourth resource file that are each of a same the second content type that is different from the first content type.

20. The apparatus of claim 15, wherein the preset threshold is 64 kilobytes.

* * * * *